Jan. 26, 1937.  M. W. McCONKEY  2,068,958
BRAKE
Filed July 18, 1935  2 Sheets-Sheet 1
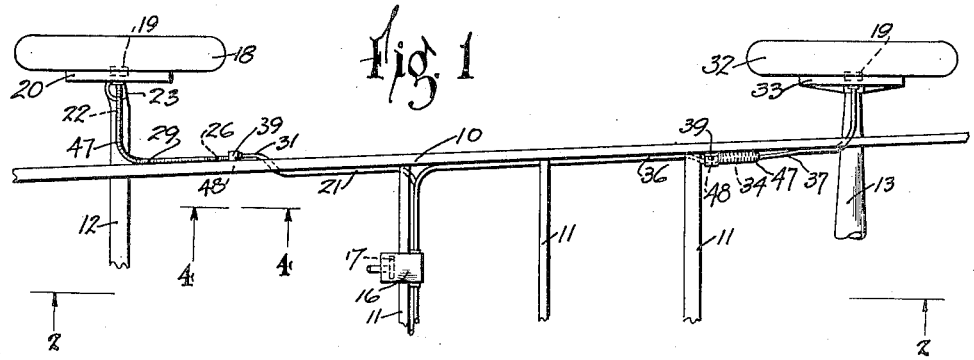
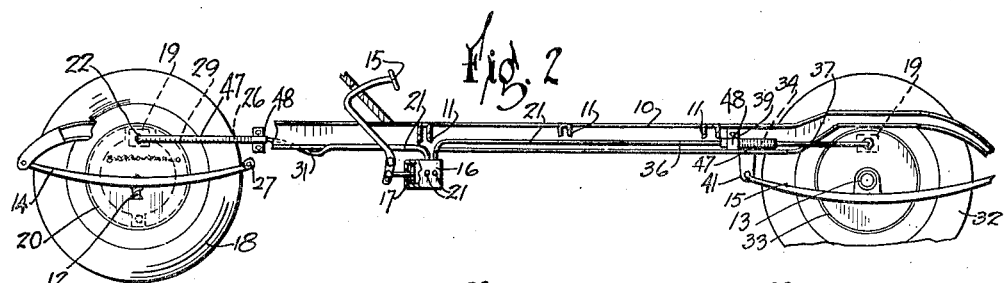
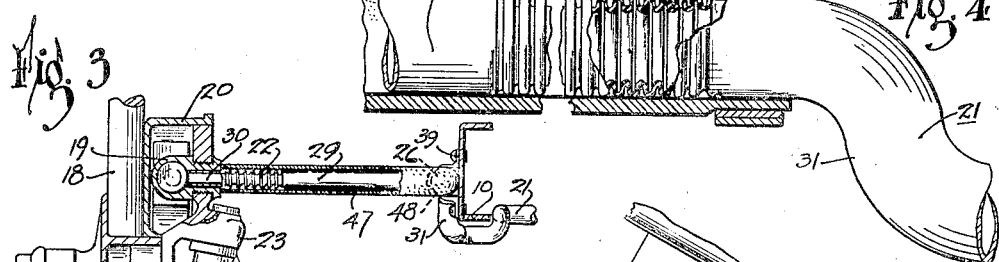
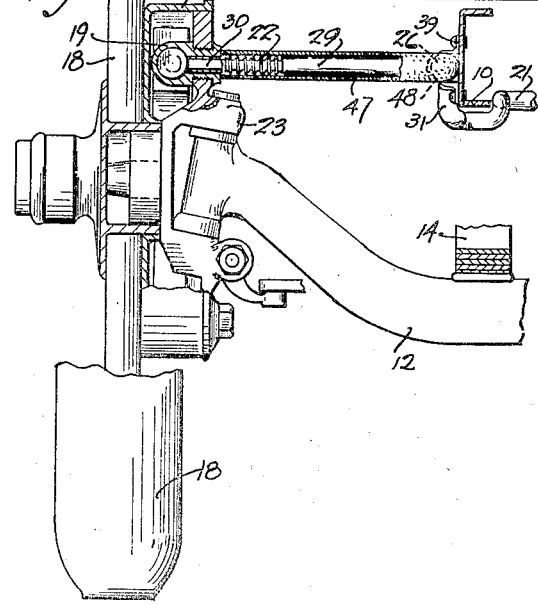
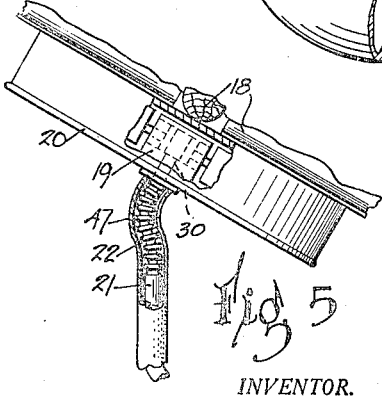
INVENTOR.
Montgomery W. McConkey
BY Jerome R. Cox
ATTORNEY.

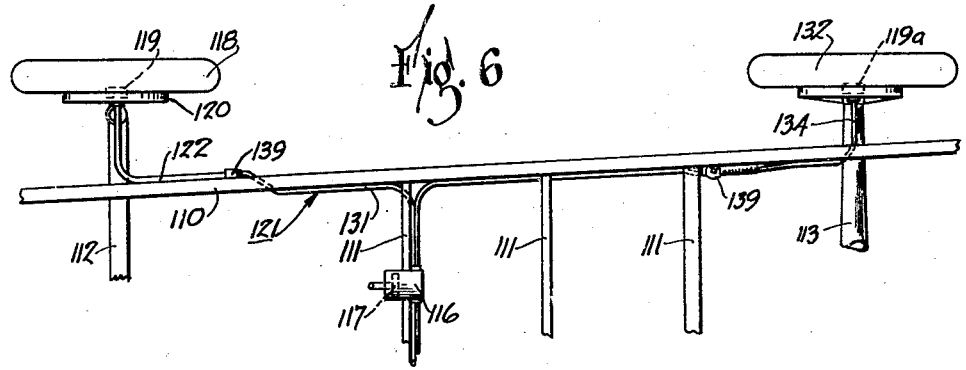
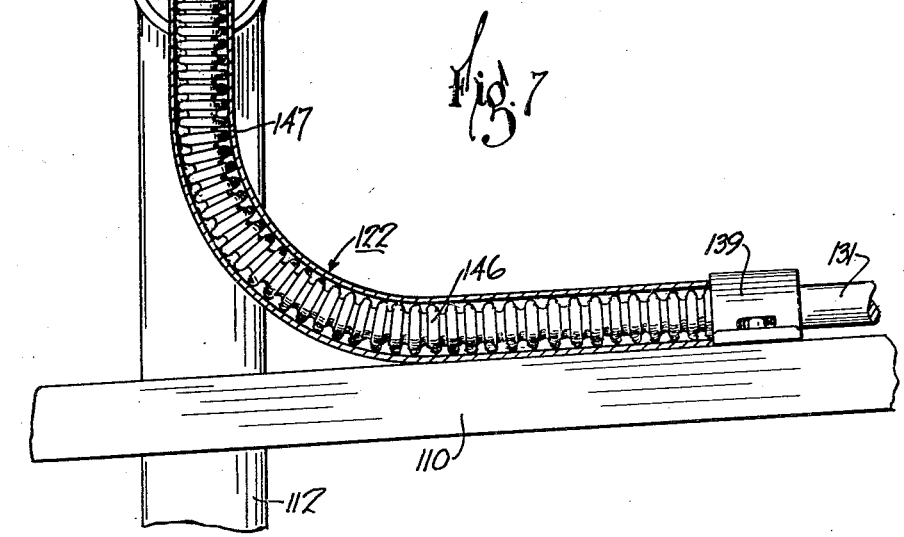

Patented Jan. 26, 1937

2,068,958

UNITED STATES PATENT OFFICE 2,068,958

BRAKE

Montgomery W. McConkey, South Bend, Ind., assignor to Bendix Research Corporation, South Bend, Ind., a corporation of Indiana Application July 18, 1935, Serial No. 32,054

9 Claims. (Cl. 188—152)

This application is in part a continuation of my copending application Serial No. 556,663.

This invention relates to vehicle brakes, and more particularly to an improved fluid conduit for a hydraulic vehicle brake.

An important object of the invention is to provide a hydraulic brake conduit that is formed from a single piece, or in other words an integral length of tubing, portions of which are of different flexibility.

Another object of the invention is to provide a single piece hydraulic brake conduit adapted for use on a vehicle in which the portions of the tubing adjacent the brake are flexible and the portions adapted to be secured to the vehicle frame are comparatively inflexible.

Another object of the invention is to provide a single piece fluid conduit for a brake having a uniform external diameter and comparatively flexible and inflexible portions.

Another object of the invention is to provide a conduit of a single piece of tubing having a comparatively inextensible portion and a comparatively extensible portion.

A further object is to provide a tubing for fluid which is inextensible in length but is also flexible and which has only metal parts contacting with the fluid.

Although the conduit has been described as particularly suited to a brake structure, it is expressly pointed out that it may be used in various other relations, and that although the brake embodiment has been stressed, various other combinations and arrangements of equal value may be made without exceeding the spirit and scope of the invention.

A feature of the invention relates to the structure of the conduit which, in the illustrative embodiment, is formed of a single piece or integral length of metallic tubing having a flexible portion formed in a series of adjacent corrugations rolled or otherwise formed therein, and another portion of conventional form, the two portions being preferably, although not necessarily, of the same external diameter.

Another feature of the invention is a conduit formed of an inner corrugated metal tube and an outer fabric whereby the tube may bend but may not change in volume.

Other objects and features of the invention will be apparent from the following description, in connection with which a preferred embodiment of the invention has been illustrated in the accompanying drawings, in which:

Fig. 1 is a somewhat diagrammatic plan view of a portion of an automobile chassis showing the improved conduit installed thereon for operating the brakes;

Fig. 2 is a somewhat diagrammatic vertical cross-sectional view taken on the lines 2—2 of Fig. 1;

Fig. 3 is an enlarged front elevation of a portion of a vehicle showing the installation for operating a swiveled wheel;

Fig. 4 is an enlarged sectional view of the improved conduit taken in the direction of the arrows 4—4 of Fig. 1;

Fig. 5 is an enlarged plan view of a portion of the front wheel shown in Fig. 3 illustrating the position of the conduit after the swiveled wheel has been turned through an appreciable angle;

Fig. 6 is a view similar to Fig. 1 showing a modified arrangement; and

Fig. 7 is an enlarged view partly in section showing a portion of the conduit shown in Fig. 6 in greater detail.

In the drawings, 10 is the vehicle frame having cross members 11 and supported on front axle 12 and rear axle 13 by springs 14 and 15 respectively. 16 is a master cylinder of a hydraulic brake system in which is a movable piston 17 adapted to be operated by any convenient means, such as a foot pedal 15.

Swiveled front wheel 18 has its brake 20 actuated by expansible member 19 connected to the master cylinder 16 by a single piece metallic conduit generally designated by 21, which has a flexible or extensible portion 22 adjacent the swiveling axis 23 of the wheel, an intermediate flexible or extensible portion 26 adjacent the spring eye 27 of front spring 14, and connecting portions 29 and 31 that are comparatively inflexible or inextensible.

Conduit 21 is preferably secured to frame 10 a slight distance rearward of spring eye 27, and portions 29 and 31, although comparatively inflexible, are preferably capable of being bent slightly to permanently conform to the shape of the frame 10. Flexible portion 22, which is located adjacent the swiveling axis 23, absorbs the conduit movement due to angular inclination of wheel 18, as shown in Fig. 5, and the flexible portion 26 absorbs conduit movement due to deflection of the spring 14.

Rear wheel 32 has the operating cylinder of its brake 33 connected to master cylinder 16 by a similar conduit, having a flexible or extensible portion 34 intermediate the comparatively inflexible portions 36 and 37, it not being necessary to incorporate a flexible portion adjacent the brake 33 unless it be desired to use a swiveled wheel in place of the conventional non-swiveling type illustrated. The rear conduit is preferably secured to frame 10 by a bracket 39 located slightly forward of spring eye 41 in order to have all flexure resulting from spring movement absorbed by the flexible or extensible portion 34. The conduits connecting the respective brakes to master cylinder 16 are similar in general construction, in that each conduit has a portion of conventional form with an adjacent corrugated portion integral therewith having a series of adjacent convolutions 43 which are preferably of the same external diameter as portion 31 and which, if desired, may have the convolutions graduated in depth as they approach the adjacent inextensible portion 31, as illustrated in Fig. 4.

Inextensible portion 30 is preferably used as a connection to the brake operating cylinder 19, but if desired the corrugations may be continued up to the point of the connection of brake operating member 19 with the conduit. A flexible protective casing 47 which is of fabric and therefore substantially inextensible and which preferably has the same internal diameter as the external diameter of the conduit, may be used and if used is secured to the inflexible portion 31 by a band 48 which holds the casing against longitudinal movement.

In the arrangement shown in Figs. 6 and 7, 110 is the vehicle frame having cross member 111. The frame is supported on front axle 112 and rear axle 113 by springs. 116 is a master cylinder of a hydraulic brake system in which the movable piston 117 is adapted to be operated by any convenient means such as a foot pedal. Swivelled front wheel 118 has its brake 120 actuated by expansible member 119 connected to the master cylinder 116 by a conduit 121 which has a flexible portion 122 adjacent the connection with the member 119 and an inflexible portion 131 extending thence to the master cylinder 116. Rear wheel 132 has a similar flexible portion 134 adjacent the connection with the expansible member 119ª. The conduits are preferably secured to the frame 110 by brackets 139 in order to have all flexure resulting from spring movement and swivelling absorbed by the flexible portion 134. The flexible portions are formed by corrugated metal tubes such as 146.

Flexible protective casings 147 are provided for the tubes 146 in order to prevent said flexible portions from expanding in volume by extension. These casings 147 are preferably of rubberized fabric and are substantially inextensible. They preferably have the same internal diameter as the external diameter of the conduit. They are secured at their ends so as to confine the inner conduit in any suitable manner, the brackets 139 so serving if desired.

While two preferred embodiments of the invention have been illustrated and described, it is understood that this showing and description are illustrative only and that the invention is not regarded as limited to the form shown or described, or otherwise, except by the terms of the following claims:

What is claimed is:

1. A fluid conduit subject to localized flexure comprising a unitary metallic member having adjacent integral portions of relatively different flexure characteristics, and a protective substantially inextensible flexible casing enclosing all of one portion and a part of the other portion, the internal diameter of the casing being substantially equal to the external diameter of the tubing.

2. A hydraulic brake conduit subject to localized flexure comprising a single length of metallic tubing having a relatively inextensible portion, a relatively extensible portion, and a flexible substantially inextensible tubular casing enclosing the extensible portion and a part of the inextensible portion of substantially the same internal diameter as the external diameter of the portions, the internal diameter of the casing being substantially equal to the external diameter of the tubing.

3. A hydraulic brake conduit for a vehicle brake having a master cylinder secured to the vehicle frame and an expansive device secured to a vehicle wheel movable with respect to the frame, comprising an integral length of metallic tubing between the cylinder and the device having a comparatively inflexible portion and a comparatively flexible corrugated portion integral therewith, said conduit being adapted to have its inextensible portion secured to the vehicle frame and its extensible portion positioned intermediate the brake and the frame, whereby relative movement between the wheel and the frame is absorbed by the flexible portion, a flexible casing enclosing the flexible portion and extending over the inflexible portion, and means for securing the casing to one of said portions, the internal diameter of the casing being substantially equal to the external diameter of the tubing.

4. Conduit means for connecting an operating device with an operated device, comprising one integral length of metal tubing which throughout most of its length is substantially inflexible but capable of being bent and which has a relatively short section of graduated flexibility including a series of adjacent corrugations, of graduated depth and a protective substantially inextensible flexible casing inclosing the short section and a portion of the inflexible tubing, the internal diameter of the casing being substantially equal to the external diameter of the tubing.

5. A brake system for an automotive vehicle in which there are provided road wheels adapted to support the vehicle through springs and adapted to be turned in steering the vehicle, a brake friction element for one of said wheels, a hydraulic wheel cylinder adapted to actuate said brake friction element, a hydraulic master cylinder for generating pressure for operating said wheel cylinder, a conduit connecting said master cylinder and said wheel cylinder having a corrugated portion subject to localized flexure and having a portion integral therewith having a substantially uniform cross section, said corrugated portion having its corrugations gradually decreasing in depth toward the uniform section portion.

6. A fluid conduit subject to localized flexure having adjacent integral portions of relatively different flexure characteristics including a portion formed of corrugated tubing, and a protective substantially inextensible flexible casing inclosing the corrugated portion and a part of the other portion, the internal diameter of the casing being substantially equal to the external diameter of the tubing.

7. A fluid conduit comprising a corrugated tubing, and a protective flexible casing substantially inextensible in length inclosing said tubing whereby the corrugated metallic tubing is maintained of substantially uniform length and capacity, while being allowed to flex, the internal diameter of the casing being substantially equal to the external diameter of the tubing.

8. In an automotive vehicle a frame member, a wheel movable relative to said frame member, a flexible conduit connecting said frame member and said wheel comprising a corrugated metallic tubing, and a protective substantially inextensible flexible casing inclosing said tubing and at its ends secured to said tubing and to said frame and wheel portion, the internal diameter of the casing being substantially equal to the external diameter of the tubing.

9. A fluid conduit comprising a corrugated metallic tubing adapted to be flexed and to be extended, and a protective flexible non-metallic casing substantially inextensible in length and inclosing said tubing and having an internal diameter substantially equal to the external diameter of the tubing whereby the corrugated metallic tubing is maintained of substantially uniform capacity and length while being allowed to flex.

MONTGOMERY W. McCONKEY.